(12) United States Patent
Goto

(10) Patent No.: US 10,284,055 B2
(45) Date of Patent: May 7, 2019

(54) ACTUATOR AND METHOD OF ADJUSTING ACTUATOR

(71) Applicant: MITSUBISHI ELECTRIC CORPORATION, Tokyo (JP)

(72) Inventor: Takashi Goto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 2 days.

(21) Appl. No.: 15/579,862

(22) PCT Filed: Sep. 1, 2015

(86) PCT No.: PCT/JP2015/074855
§ 371 (c)(1),
(2) Date: Dec. 5, 2017

(87) PCT Pub. No.: WO2017/037870
PCT Pub. Date: Mar. 9, 2017

(65) Prior Publication Data
US 2018/0358869 A1   Dec. 13, 2018

(51) Int. Cl.
*H02K 11/00* (2016.01)
*H02K 11/215* (2016.01)
(Continued)

(52) U.S. Cl.
CPC ........... *H02K 11/215* (2016.01); *H02K 33/00* (2013.01); *H02P 6/16* (2013.01)

(58) Field of Classification Search
CPC ...... H02K 11/215; H02K 11/20; H02K 11/21; H02K 33/00; H02P 21/06; H02P 6/04; H02P 6/15; H02P 6/16; H02P 23/0077
(Continued)

(56) References Cited

U.S. PATENT DOCUMENTS 6,293,006 B1 * 9/2001 Takeda ............... H05K 13/0413
29/832
9,906,185 B2 * 2/2018 Dumas .................. H02P 29/024
(Continued)

FOREIGN PATENT DOCUMENTS

| JP | 8-178612 A | 7/1996 |
| JP | 2006-288166 A | 10/2006 |

(Continued)

OTHER PUBLICATIONS

International Search Report for PCT/JP2015/074855 (PCT/ISA/210) dated Nov. 24, 2015.

*Primary Examiner* — Thanh Lam
(74) *Attorney, Agent, or Firm* — Birch, Stewart, Kolasch & Birch, LLP

(57) ABSTRACT

A Hall IC of an actuator calculates a relative angle by using magnetic flux densities in two directions, and corrects a linearity error in the relative angle by using correction values at correction points and a function to calculating an interpolated correction value between correction points, the correction values and the function being stored in a storage. The storage stores, as correction values at outermost correction points in a relative angle range, correction values $L\alpha$ and $L\beta$ causing linearity errors which are outermost ones of plural extremums to be equal to or less than linearity errors which are other ones of the plural extremums each of which is located inwardly next to the outermost extremum, the plural extremums being exhibited by the linearity error in the relative angle which is corrected by using an interpolated correction value calculated from the function which uses the correction values as parameters.

6 Claims, 9 Drawing Sheets

(51) Int. Cl.
*H02K 33/00* (2006.01)
*H02P 6/16* (2016.01)

(58) Field of Classification Search
USPC .................................. 310/68 B; 318/315, 245
See application file for complete search history.

(56) References Cited

U.S. PATENT DOCUMENTS

2006/0001390 A1* 1/2006 Yamazaki ............ H02K 41/031
    318/135
2011/0066327 A1* 3/2011 Horiuchi .............. B62D 5/0406
    701/41
2016/0344323 A1* 11/2016 Sun .......................... H02P 6/16

FOREIGN PATENT DOCUMENTS

| | | |
|---|---|---|
| JP | 2008-241675 A | 10/2008 |
| JP | 2012-13179 A | 1/2012 |
| JP | 2014-509362 A | 4/2014 |
| WO | WO 2013/061357 A1 | 5/2013 |

* cited by examiner

ACTUATOR AND METHOD OF ADJUSTING ACTUATOR

TECHNICAL FIELD

The present invention relates to an actuator of direct acting type provided with a Hall IC (Integrated Circuit), and a method of adjusting the actuator.

BACKGROUND ART

There has been a tendency that year by year exhaust gas regulations on vehicles are being tightened up, and it is expected that stricter exhaust gas regulations will be applied in the future. Thus, the electrification of an engine and its peripheral equipment is advanced as a measure against exhaust gas regulations, and an electric actuator is used in a control driving unit in many cases (for example, refer to Patent Literatures 1 and 2).

Driving methods for actuators are classified into ones of rotating type and ones of direct acting type. In an actuator of rotating type, a shaft rotates in a direction of rotation of a rotor. In an actuator of direct acting type, a shaft reciprocates in directions perpendicular to a direction of rotation of a rotor.

CITATION LIST

Patent Literature

Patent Literature 1: Japanese Unexamined Patent Application Publication No. 2012-13179
Patent Literature 2: Japanese Unexamined Patent Application Publication (Translation of PCT Application) No. 2014-509362

SUMMARY OF INVENTION

Technical Problem

In a conventional actuator of direct acting type, in order to detect the position of a shaft in a reciprocating direction, a magnetic sensor such as a Hall IC is used. Because a magnet for sensor fixed to the shaft reciprocates with a reciprocating motion of the shaft, and, as a result, the magnetic flux density flowing through the magnetic sensor varies, it is possible to convert the magnetic flux density detected by the magnetic sensor into the position of the shaft in the reciprocating direction.

It is required that an actuator operates with a high degree of accuracy for the reduction of exhaust gas when used in an engine room. For example, because an actuator that performs opening and closing control on a waste gate valve of a turbocharger needs to control the degree of opening of the valve in accordance with an instructed degree of opening from an ECU (Engine Control Unit), it is desirable that an ideal motion of the shaft according to the instructed degree of opening from the ECU is the same as the actual motion of the shaft. However, there is a case in which actually, because of the influence of temperature on the magnetic sensor, the influence of an external magnetic field on the magnetic sensor, variations in products embodying the actuator, looseness in the actuator, and so on, an error occurs between the shaft position detected by the magnetic sensor and the actual shaft position, and the shaft is moved to a non-intended position which deviates from the position specified by the instructed degree of opening from the ECU. Hereafter, the error between the shaft position detected by the magnetic sensor and the actual shaft position is referred to as a linearity error.

A problem is that when a linearity error occurs in the actuator, there is a possibility that a large influence is exerted upon the vehicle. For example, when the degree of opening of the valve is shifted toward an opening direction with respect to the instructed degree of opening from the ECU in the above-mentioned actuator for waste gate valve, the boost pressure drops and it becomes impossible to achieve required performance. In contrast, when the degree of opening of the valve is shifted toward a closing direction, the boost pressure rises, and, as a result, the supercharging pressure also rises, the load on the turbine blades increases, and this causes a breakage of the turbine blades. Therefore, it is required that a way of reducing the linearity error is provided as a specification of the actuator.

The present invention is made in order to solve the above-mentioned problems, and it is therefore an object of the present invention to provide an actuator having a small linearity error.

Solution to Problem

An actuator according to the present invention includes: a shaft capable of reciprocating in an axis direction; a driver to drive the shaft to reciprocate; a magnet that reciprocates in synchronization with a reciprocating motion of the shaft; a magnetic detector to detect magnetic flux densities in two directions of a magnetic field which vary with a reciprocating motion of the magnet; a storage to store both correction values at three or more correction points which are predetermined in a relative angle range within which the magnet can reciprocate with respect to the magnetic detector, and a function to calculate an interpolated correction value between correction points by using the correction values as parameters; and an arithmetic operation unit to calculate a relative angle of the magnet with respect to the magnetic detector by using the magnetic flux densities in the two directions which are detected by the magnetic detector, and to correct a linearity error in the relative angle by using the interpolated correction value calculated from either the correction values or the function which are stored in the storage, in which the storage stores, as a correction value at an outermost correction point in the relative angle range, a correction value causing an outermost extremum out of plural extremums in the relative angle range to be equal to or less than another extremum out of the plural extremums which is located inwardly next to the outermost extremum, the plural extremums being exhibited by a linearity error in a relative angle which is corrected by using an interpolated correction value calculated from the function which uses the correction values as parameters.

Advantageous Effects of Invention

According to the present invention, as a correction value at an outermost correction point in the relative angle range, there is stored a correction value causing an outermost extremum out of the plural extremums in the relative angle range to be equal to or less than another extremum out of the plural extremums which is located inwardly next to the outermost extremum, the plural extremums being exhibited by the linearity error in the relative angle which is corrected by using an interpolated correction value calculated from the function which uses the correction values as parameters. Therefore, by using the correction value and an interpolated correction value calculated from the function which uses the correction value as a parameter to correct the relative angle on an outer end, where linearity error is substantial, in the relative angle range, an actuator having a small linearity error can be provided.

DESCRIPTION OF EMBODIMENTS

Hereafter, in order to explain this invention in greater detail, the embodiments of the present invention will be described with reference to accompanying drawings.

Embodiment 1

Figure 1:
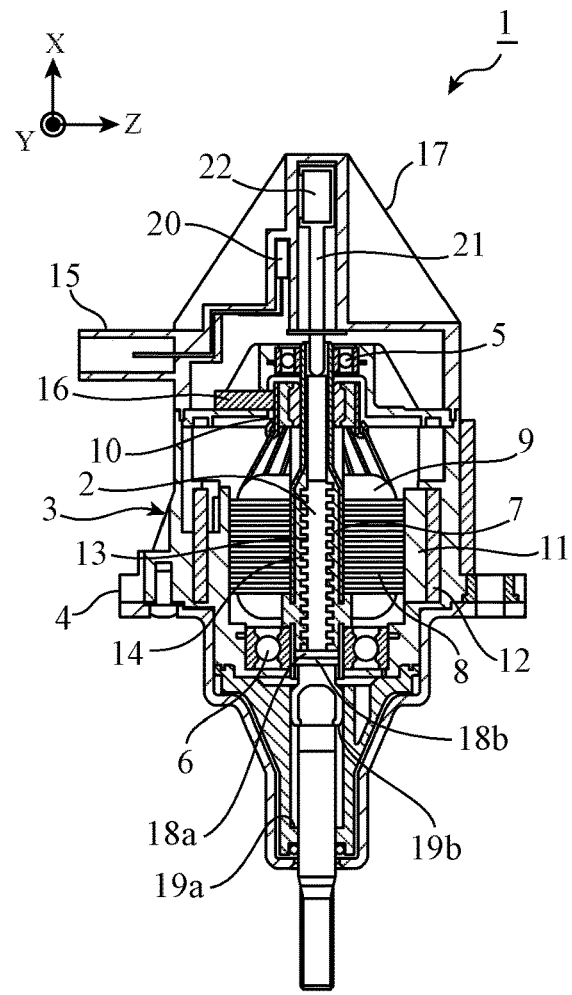
FIG. 1 is a cross-sectional view showing an example of the structure of an actuator according to Embodiment 1 of the present invention.

FIG. 1 is a cross-sectional view showing an example of the structure of an actuator 1 according to Embodiment 1 of the present invention. The actuator 1 is of direct acting type, and causes a shaft 2 to reciprocate in directions of the axis of the shaft. In Embodiment 1, a direction of the axis of the shaft 2 is referred to as an X axis, and directions perpendicular to the X axis are referred to as a Y axis and a Z axis. On the page of FIG. 1, the X axis is an upward or downward direction, the Y axis is a depth direction, and the Z axis is a rightward or leftward direction.

Hereafter, an explanation will be made by assuming that the actuator 1 of direct acting type is used for an application for opening and closing a waste gate valve of a turbocharger. The application of the actuator 1 is not limited to a waste gate, and the actuator can be used for any application.

A motor unit 3 is a driving unit. Any type of driving unit can be used as long as the driving unit can generate a driving force that causes the shaft 2 to reciprocate in the direction of the X axis. In FIG. 1, an example of using, as the motor unit 3, a motor equipped with a brush is shown. Two bearings 5 and 6 are mounted in a motor housing 4, and a pipe 7 is supported rotatably. A rotor core 8 and a rotor coil 9 which serve as a rotor are fixed to an outer circumferential surface of the pipe 7. Further, a commutator 10 is fixed to one end of the pipe 7, and the rotor coil 9 is connected to the commutator 10. A magnet 11 and a back yoke 12 which serve as a stator are fixed to an inner circumferential surface of the motor housing 4 in such a way as to surround the rotor.

The shaft 2 is arranged in the pipe 7. A female screw portion 13 is formed in an inner circumferential surface of the pipe 7. Further, a male screw portion 14 is formed in an outer circumferential surface of the shaft 2, and this male screw portion 14 is screwed into the female screw portion 13, so that the male screw portion is coupled to the female screw portion. One end of the shaft 2 penetrates the motor housing 4, and is joined to a not-illustrated waste gate valve. In a portion at another end of the shaft 2 and ahead of the commutator 10, a Hall IC 20 which is a magnetic sensor, a shaft for sensor 21, and a magnet for sensor 22 are arranged. The details of the Hall IC 20 and so on will be mentioned below.

When a voltage is applied to a connector terminal 15, a current flows through a brush 16, and is then passed through the rotor coil 9 via the commutator 10. When a current is passed through the rotor coil 9, the rotor core 8 is magnetized and a pole is formed. The magnetized rotor core 8 is attracted by the magnet 11, and, as a result, the rotor rotates and the pipe 7 and the commutator 10 which are integral with the rotor also rotate. The phase of the current flowing through the rotor coil 9 changes with the rotation of the commutator 10, and, as a result, the pole of the rotor core 8 also changes and the rotor continues rotating. The rotary motion of the rotor is converted into a linear motion in a direction of the X axis by the coupling between the female screw portion 13 of the pipe 7 and the male screw portion 14 of the shaft 2, so that the shaft 2 is pushed out of the motor housing 4. When the current flowing through the rotor coil 9 is reversed, the rotor rotates in the opposite direction and the shaft 2 is retracted into the inside of the motor housing 4. The waste gate valve is opened and closed with the reciprocating motion of the shaft 2.

Stoppers 18a and 19a for restricting a range within which the shaft 2 reciprocates are disposed at a lower end of the pipe 7 and on an inner circumferential surface of the motor housing 4. Further, a contact portion 18b which comes into contact with the stopper 18a and a contact portion 19b which comes into contact with the stopper 19a are disposed in the shaft 2. A stroke range within which the shaft 2 reciprocates extends from a position where the contact portion 18b is in contact with the stopper 18a to a position where the contact portion 19b is in contact with the stopper 19a. When one of the contact portions 18b and 19b comes into contact with a corresponding one of the stoppers 18a and 19a, a certain amount of planar pressure is applied to them by the driving force of the motor unit 3. Thus, it is desirable to avoid the use of a material, such as a resin, which easily becomes deformed, and use a metallic member which hardly becomes deformed, for the stoppers 18a and 19a and the contact portions 18b and 19b.

The Hall IC 20 that detects magnetic flux densities in two directions is fixed inside a sensor housing 17. Further, the shaft for sensor 21 in contact with an end surface of the shaft 2 is arranged inside the sensor housing 17, and the magnet for sensor 22 is fixed to the shaft for sensor 21. Therefore, the shaft for sensor 21 and the magnet for sensor 22 also reciprocate in synchronization with the reciprocating motion in the direction of the X axis of the shaft 2. The sensor housing 17 and the shaft for sensor 21 are nonmagnetic substances.

Figure 2:
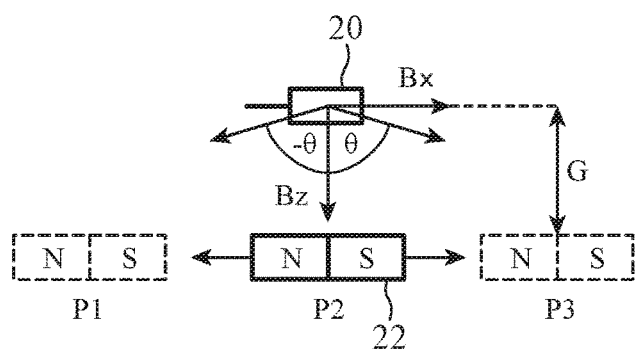
FIG. 2 is a diagram explaining a simple model of a Hall IC and a magnet for sensor in Embodiment 1.

FIG. 2 is a diagram explaining a simple model of the Hall IC 20 and the magnet for sensor 22 in Embodiment 1. When the shaft 2 moves to the position where the stopper 19a is in contact with the contact portion 19b, the magnet for sensor 22 moves to a position P1 in synchronization with the shaft. When the shaft 2 moves to the position where the stopper 18a is in contact with the contact part 18b, the magnet for sensor 22 moves to a position P3 in synchronization with the shaft. A position P2 is one where the magnet for sensor 22 is the closest to the Hall IC 20, and is at approximately the same distance from the positions P1 and P3.

A range of relative angles within which the magnet for sensor 22 can reciprocate with respect to the Hall IC 20, this range corresponding to the range from the position P1 to the position P3 which is the stroke range of the shaft 2, is referred to as a "relative angle range."

Further, it is assumed that with respect to the magnetic field generated by the magnet for sensor 22, a Bx axis, a By axis, and a Bz axis parallel to the X axis, the Y axis, and the Z axis are set.

Figure 3:
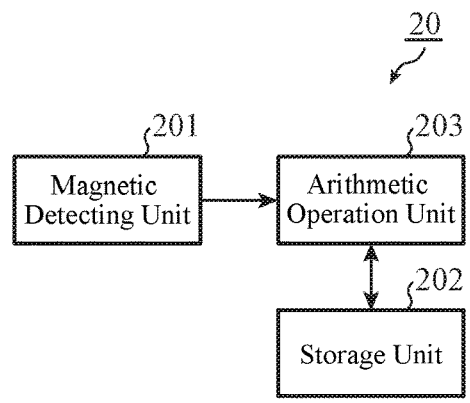
FIG. 3 is a block diagram showing an example of the structure of the Hall IC in Embodiment 1.

FIG. 3 is a block diagram showing an example of the structure of the Hall IC 20 in Embodiment 1.

The Hall IC 20 includes a magnetic detecting unit 201 that detects magnetic flux densities in two directions of a magnetic field which vary with a reciprocating motion of the magnet for sensor 22, a storage unit 202 that stores both correction values at three or more correction points which are predetermined in the range of relative angles between the magnetic detecting unit 201 and the magnet for sensor 22, and a function to calculate an interpolated correction value between correction points by using the correction values as parameters, and an arithmetic operation unit 203 that calculates the relative angle of the magnet for sensor 22 with respect to the magnetic detecting unit 201 by using the magnetic flux densities in the two directions which are detected by the magnetic detecting unit 201, and that corrects a linearity error in the relative angle by using either the correction values or functions which are stored in the storage unit 202.

In the example of FIG. 2, the magnetic detecting unit 201 detects, as the magnetic flux densities in the two directions, both a magnetic flux density in a direction of the Bx axis and a magnetic flux density in a direction of the Bz axis. The magnetic detecting unit 201 can alternatively detect, as the magnetic flux densities in the two directions, both the magnetic flux density in the direction of the Bx axis and a magnetic flux density in a direction of the By axis.

By using both the magnetic flux density in the direction of the Bx axis and the magnetic flux density in the direction of the Bz axis, the arithmetic operation unit 203 calculates the relative angle θ of the magnet for sensor 22 with respect to the Hall IC 20 with the Bz axis as a reference, in accordance with an equation (1). The relative angle θ calculated in accordance with the equation (1) has a value which can be converted into the stroke position of the shaft 2 in the direction of the X axis. Further, in the equation (1) and an equation (2) which will be mentioned below, Bx denotes the magnetic flux density in the direction of the Bx axis, and Bz denotes the magnetic flux density in the direction of the Bz axis.

$$\theta = a\tan(Bx/Bz) \qquad (1)$$

Figure 4:
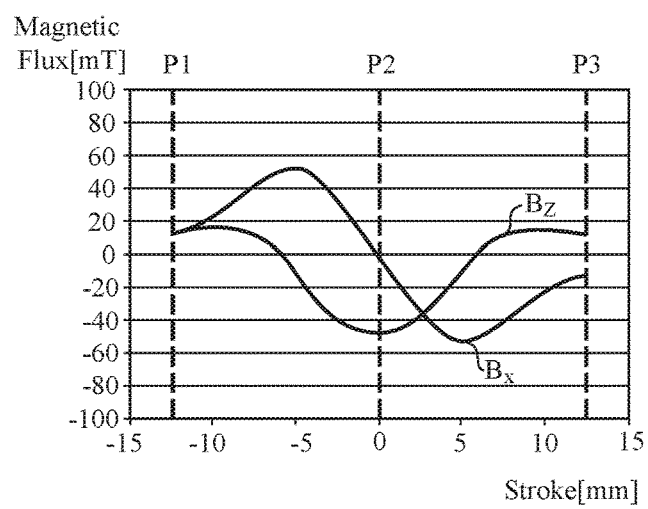
FIG. 4 is a graph showing the waveforms of magnetic flux densities in two directions while the magnet for sensor is moving, in Embodiment 1.
Figure 5:
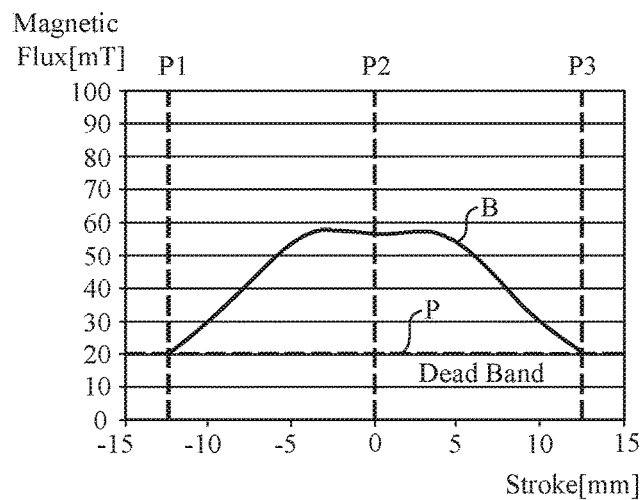
FIG. 5 is a graph showing the waveform of a composite value which is acquired by combining the magnetic flux densities in the two directions shown in FIG. 4.

FIG. 4 shows the waveforms of the magnetic flux density in the direction of the Bx axis and the magnetic flux density in the direction of the Bz axis while the magnet for sensor 22 is moving. Further, FIG. 5 shows the waveform of a composite value B which is acquired by combining the magnetic flux density in the direction of the Bx axis and the magnetic flux density in the direction of the Bz axis which are shown in FIG. 4. In FIGS. 4 and 5, the vertical axis of the graphs shows the magnetic flux density, and the horizontal axis of the graphs shows the position of the magnet for sensor 22, i.e., the stroke of the shaft 2. The composite value B is calculated in accordance with the equation (2).

$$B = \sqrt{Bx^2 + Bz^2} \qquad (2)$$

In a case in which a fixed air gap G is provided between the Hall IC 20 and the magnet for sensor 22 with respect to the direction of the Bz axis, as shown in FIG. 2, it is desirable to select, as the magnet for sensor 22, a magnet that causes the composite value B to be greater than a minimum magnetic flux density P which can be detected by the Hall IC 20 throughout the whole stroke range from the position P1 to the position P3. In addition, by selecting a magnet having a minimum size which satisfies this condition, the cost can be reduced.

Because vehicle parts are used under high temperature environments, it is basically desirable to use, as the magnet for sensor 22 which is used for the actuator 1 for opening and closing a waste gate valve, a sintered samarium cobalt magnet. The sintered samarium cobalt magnet has a temperature change rate of magnetic flux density which is as low as 0.1 mT/° C. or less, so that the sintered samarium cobalt magnet is suitable for use at high temperatures. However, depending on the operating environment of the actuator 1, a neodymium magnet, a ferrite magnet, or the like can be used as the magnet for sensor 22.

Figure 6:
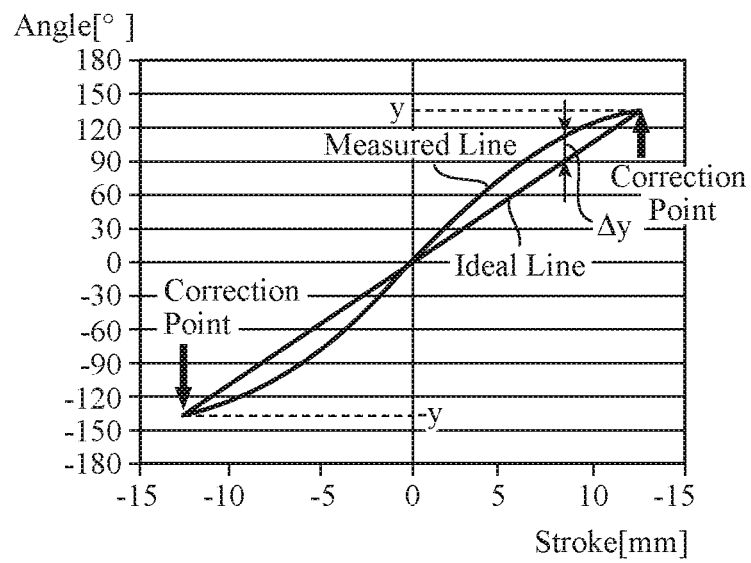
FIG. 6 is a graph explaining an ideal line and a measured line each of which shows a correspondence between a relative angle calculated from detected values of the magnetic flux densities in the two directions, and a stroke, the measured line being subjected to a two-point correction.

FIG. 6 is a graph explaining an ideal line and a measured line each of which shows a correspondence between the relative angle e calculated from the detected values of the magnetic flux densities in the two directions, and the stroke, and the measured line shows measurement results which are corrected at two points as will be mentioned below. Although the units of the relative angle θ calculated in accordance with the equation (1) are radians, the relative angle will be expressed in degrees hereafter. The vertical axis of the graph shows the relative angle θ of the magnet for sensor 22 with respect to the Hall IC 20, and the horizontal axis shows the stroke of the shaft 2. It is assumed to be ideal that the characteristics of the actuator 1, i.e., the correspondence between the relative angle θ calculated by the Hall IC 20 and the actual stroke of the shaft 2 is expressed by a straight line shown as the ideal line. However, actually, due to the influence of temperature upon the Hall IC 20, the influence of an external magnetic field upon the Hall IC 20, variations in products embodying the actuator 1, looseness inside the actuator 1, and so on, the measured line which is comprised of the relative angles θ calculated by the Hall IC 20 deviates from the ideal line, and a linearity error occurs.

The linearity error shows the degree of deviation of the measured line from the ideal line. As shown in an equation (3), the linearity error L is expressed by the ratio of the difference Δy between the relative angle θ shown by the measured line and the relative angle θ shown by the ideal line, to the difference 2y between a maximum value y and a minimum value −y of the relative angle θ calculated by the Hall IC 20.

$$L(\%)=\Delta y/2y\times 100 \qquad (3)$$

Further, in the graph shown in FIG. 6, two points, one having the maximum value and one having the minimum value are determined as correction points in the relative angle range from the position P1 to the position P3, and the measured line is corrected in such a way as to match the ideal line at each of the two correction points. In addition, the measured line between the two correction points is corrected in such a way as to be approximated to, for example, a sinusoidal wave curve, a parabolic curve, or the like.

Concretely, when the relative angle calculated from the magnetic flux densities detected by the magnetic detecting unit 201 matches either of the predetermined two correction points, the arithmetic operation unit 203 corrects the relative angle by using the correction value at the correction point matching the relative angle. The correction value corresponds to the linearity error included in the calculated relative angle. Further, it is assumed that each correction point represents a relative angle which corresponds to an ideal stroke position of the shaft 2 and which includes a linearity error.

In contrast, when the relative angle calculated from the magnetic flux densities detected by the magnetic detecting unit 201 differs from any of the two predetermined correction points, the arithmetic operation unit 203 carries out interpolation on the basis of the predetermined function, such as a sinusoidal wave curve or a parabolic curve, by using, as parameters, the correction values at the two correction points and the calculated relative angle, to calculate an interpolated correction value, and corrects the relative angle by using the interpolated correction value calculated thereby. The interpolated correction value in this case corresponds to the linearity error included in the calculated relative angle.

The interpolated correction value can be a value which corresponds to, instead of the linearity error included in the calculated relative angle, a value acquired after the correction of the linearity error included in the calculated relative angle. More specifically, when the calculated relative angle differs from any of the two predetermined correction points, the arithmetic operation unit 203 carries out interpolation on the basis of the predetermined function, such as a sinusoidal wave curve or a parabolic curve, by using, as parameters, the correction values at the two correction points and the calculated relative angle, to calculate an interpolated correction value corresponding to the relative angle in which the linearity error has been corrected and replace the relative angle with the calculated, interpolated correction value, thereby correcting the relative angle.

Figure 7:
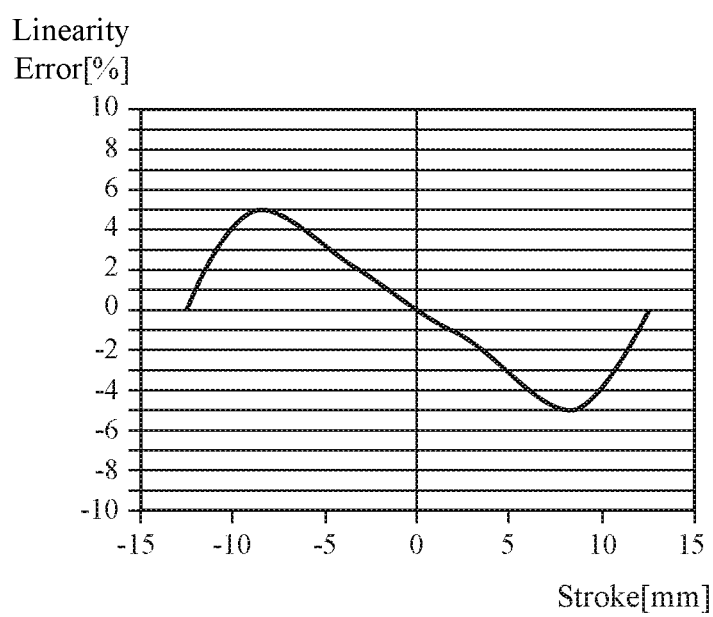
FIG. 7 is a graph showing a linearity error which remains in the measured line shown in FIG. 6 to which the two-point correction has been made.

FIG. 7 is a graph showing the linearity error which remains in the measured line shown in FIG. 6 to which the two-point correction has been made. The vertical axis of the graph shows the linearity error calculated in accordance with the above equation (3), and the horizontal axis shows the stroke. In the correction with the number n of correction points=2, the linearity error is large.

Thus, according to Embodiment 1, the arithmetic operation unit 203 makes a multipoint correction with the number n of correction points≥3, to reduce the linearity error.

Figure 8:
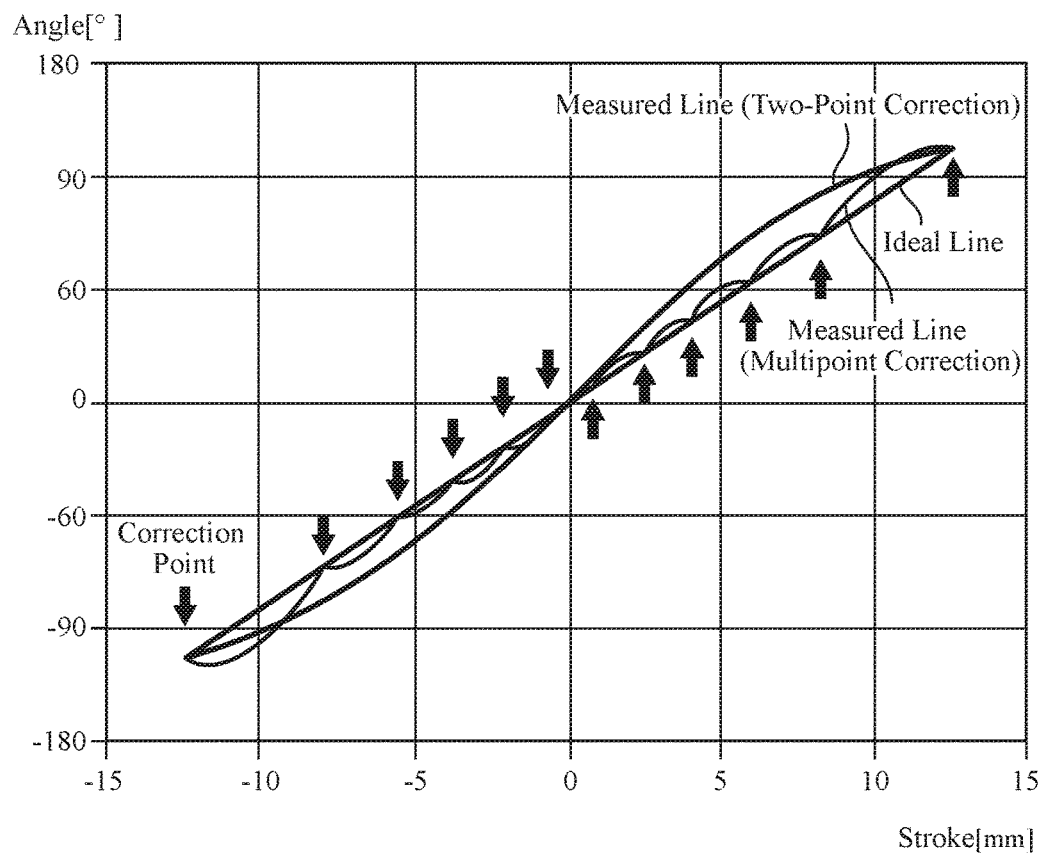
FIG. 8 is a graph explaining an ideal line and a measured line each of which shows a correspondence between the relative angle calculated from the detected values of the magnetic flux densities in the two directions, and the stroke, the measured line being subjected to a multipoint correction.

FIG. 8 is a graph explaining an ideal line and a measured line each of which shows a correspondence between the relative angle θ calculated from the detected values of the magnetic flux densities in the two directions, and the stroke, the measured line being subjected to a multipoint correction. The vertical axis of the graph shows the relative angle θ, and the horizontal axis shows the stroke. Further, for reference, the measured line shown in the graph of FIG. 6 to which the two-point correction has been made is also shown.

In the graph of FIG. 8, correction points whose number n is n≥3 are determined in the relative angle range, and the measured line is corrected in such a way as to match the ideal line at each of the correction points whose number n is n≥3. Further, the measured line between two correction points adjacent to each other is corrected in such a way as to be approximated to, for example, a sinusoidal wave curve, a parabolic curve, or the like.

Figure 9:
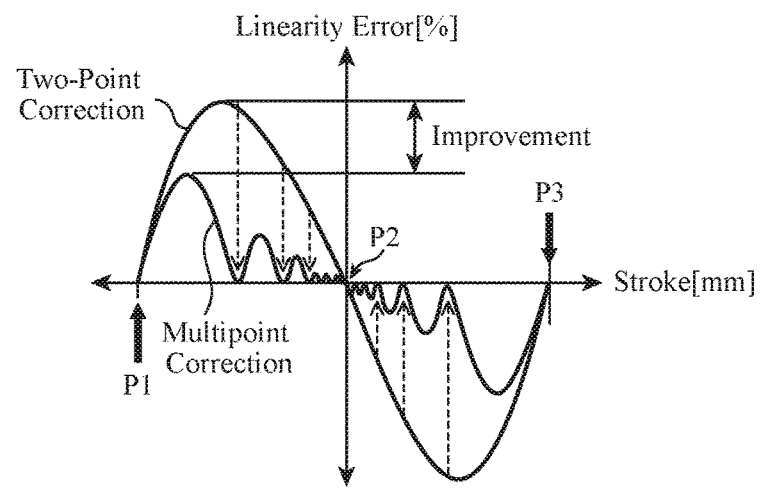
FIG. 9 is a graph shows a linearity error which remains in the measured line shown in FIG. 8 to which the multipoint correction has been made.

FIG. 9 is a graph showing the linearity error which remains in the measured line shown in FIG. 8 to which the multipoint correction has been made. The vertical axis of the graph shows a linearity error L calculated in accordance with the above equation (3), and the horizontal axis shows the stroke. Further, for reference, the linearity error which remains in the measured line shown in the graph of FIG. 7 to which the two-point correction has been made is also shown.

The linearity error is reduced as the number n of correction points increases, so that the linearity is improved. However, the storage unit 202 for storing the correction value corresponding to each of the correction points increases in capacity as the number n of correction points increases. Thus, this causes an increase in cost of the Hall IC 20 and an increase in size of the Hall IC 20. Therefore, it is desirable that the number n of correction points is set to such a value that the linearity which is required as a specification of the actuator 1 is satisfied, and the cost and size of the actuator are permitted as a product.

Figure 10:
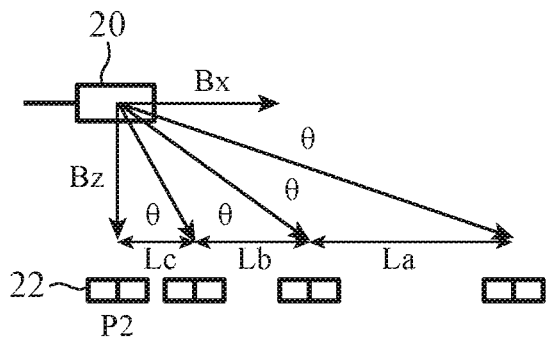
FIG. 10 is a diagram explaining a correction of the relative angle at equal intervals in the simple model shown in FIG. 2 of the Hall IC and the magnet for sensor.

Further, because it is necessary to make a correction at equiangular intervals to the relative angle θ, as shown in FIG. 10, the stroke position is not corrected at equal intervals when the relative angle is converted into the stroke of the shaft 2. Thus, the intervals La to Lc between correction points are extended as the magnet for sensor 22 goes away from the position P2. That is, the following inequality La>Lb>Lc holds. Therefore, as shown in FIG. 9, in the measured line to which the multipoint correction has been made, the linearity error becomes large and the linearity deteriorates as the magnet for sensor 22 goes away from the position P2. On a side of each of the positions P1 and P3 where the interval between correction points is the longest, the linearity error is the largest. To solve this problem, according to Embodiment 1, by reducing the linearity error on the side of each of the positions P1 and P3, an actuator 1 having a small linearity error is provided.

Figure 11:
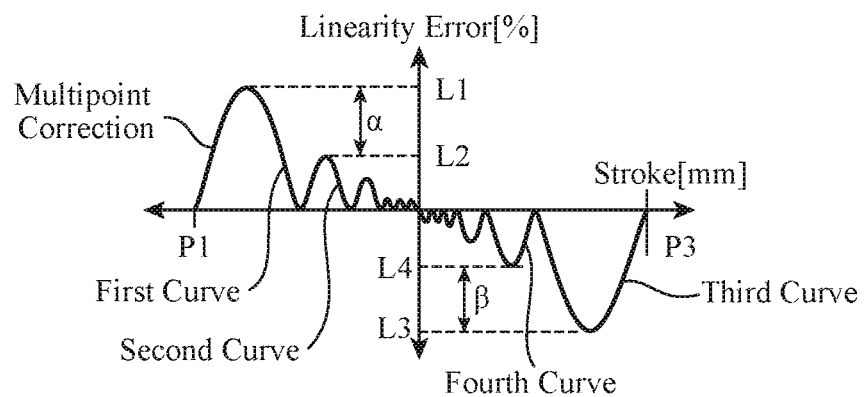
FIG. 11 is a graph showing a linearity error which remains in the measured line to which the multipoint correction has been made.

FIG. 11 shows the linearity error which remains in the measured line to which the multipoint correction has been made. The vertical axis of the graph shows the linearity error L calculated in accordance with the above equation (3), and the horizontal axis shows the stroke.

In this case, in the relative angle range, among plural mountain-shaped curves exhibited by the linearity error which remains in the relative angle which is corrected by using correction values and an interpolated correction value, an outermost peak on the side of the position P1 is defined as "first peak" and a peak which is located inwardly next to "first peak" is defined as "second peak". Further, an outermost peak on the side of the position P3 is defined as "third peak" and a peak which is located inwardly next to "third peak" is defined as "fourth peak".

For example, the curve of the first peak shows the linearity error in the relative angle which is corrected by using an interpolated correction value calculated by the function which uses, as parameters, both the correction value at the correction point at the position P1 and the correction value at the correction point which is located inwardly next to the correction point at the position P1. The function is, for example, a sinusoidal wave curve, a parabolic curve, or the like, and is stored as interpolation information in the storage unit 202.

The curve of another peak other than the first peak shows the linearity error in the relative angle which is corrected by using an interpolated correction value calculated by the function which uses, as parameters, the two correction values at the two correction points which sandwich the other peak therebetween.

As shown in FIG. 11, peaks which exhibit the following inequalities: the first peak>the second peak and the third peak>the fourth peak are formed.

Properly speaking, in the "correction", in order to reduce the deviation between the ideal line and the measured line to zero, the relative angle θ should be corrected to a value matching the ideal line at each correction point.

However, according to Embodiment 1, by correcting the relative angle θ to a value which does not match the ideal line at each of the correction points corresponding to the positions P1 and P3, the linearity error in each of the first and third peaks in which the linearity becomes worst is reduced.

In Embodiment 1, a method of calculating correction values at the outermost correction points in the relative angle range, i.e., correction values at the correction points corresponding to the positions P1 and P3 will be explained with reference to graphs shown in FIGS. 12 and 13.

Figure 12:
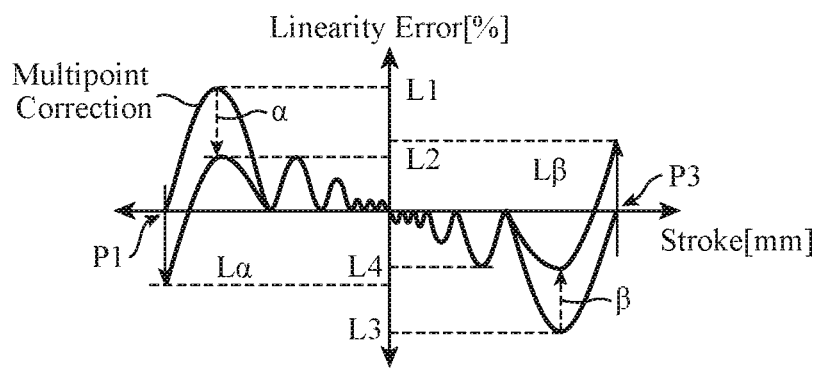
FIG. 12 is a graph explaining a method of calculating correction values at outermost correction points in a relative angle range in Embodiment 1.

FIG. 12 is a graph explaining the method of calculating correction values at the outermost correction points in the relative angle range in Embodiment 1. FIG. 13 is a graph showing an example of, in Embodiment 1, making a multipoint correction to the measured line shown in FIG. 8 by using the calculated correction values at the outermost correction points in the relative angle range.

A PC (Personal Computer) tool or the like, which will be mentioned below, uses, as parameters, both the correction value at the correction point at the position P1 and the correction value at the correction point which is located inwardly next to the correction point at the position P1, to calculate an interpolated correction value for each relative angle between the correction points by using the function which is interpolation information. The PC tool then calculates the linearity error which remains in each relative angle between the correction points which is corrected by using the interpolated correction value, to determine a first peak, and sets a maximum value of this peak as a linearity error L1.

The PC tool further uses, as parameters, both the correction value at the correction point which is located inwardly next to the correction point at the position P1 and the correction value at the correction point which is located inwardly by two points from the correction point at the position P1, to calculate an interpolated correction value for each relative angle between the correction points by using the function in the same way as above. The PC tool then calculates the linearity error which remains in each relative angle between the correction points which is corrected by using the interpolated correction value, to determine a second peak, and sets its maximum value as a linearity error L2.

The PC tool calculates the difference a between the linearity error L1 which is the maximum value of the first peak and the linearity error L2 which is the maximum value of the second peak, in accordance with an equation (4). The PC tool then calculates a correction value Lα at the correction point corresponding to the position P1, the correction value causing the linearity error L1 which is the maximum value of the first peak to be equal to or less than a value which is acquired by subtracting the difference a from the linearity error L1. As shown in FIG. 13, the relative angle Ya which is corrected using the correction value Lα has a value which deviates from the linear ideal line. Further, this correction value Lα is a "first correction value", and is stored in the storage unit 202.

$$|L1-L2|=\alpha \qquad (4)$$

As a correction value Lβ at the correction point corresponding to the position P3 which is opposite to the position P1, the correction value La at the position P1 can be used just as it is. However, because there is also a case in which the linearity error on a side of the position P1 and the linearity error on a side of the position P3 have variations due to tolerances on the components of the actuator 1, and so on, and thus the correction value Lα and the correction value Lβ are not equal to each other, the correction value Lβ can be calculated separately from the correction value Lα.

For example, the PC tool calculates the difference β between a linearity error L3 which is a minimum value of the third peak and a linearity error L4 which is a minimum value of the fourth peak, in accordance with an equation (5). The PC tool then calculates a correction value Lβ at the correction point corresponding to the position P3, the correction value causing an absolute value of the linearity error L3 which is the minimum value of the third peak to be equal to or less than a value which is acquired by subtracting the difference β from the absolute value of the linearity error L3. As shown in FIG. 13, the relative angle Yb which is corrected using the correction value Lβ has a value which deviates from the linear ideal line. Further, this correction value Lβ is a "second correction value", and is stored in the storage unit 202. In this embodiment, α≠β and Lα≠Lβ because of the tolerances on the components of the actuator 1, and so on.

$$|L3-L4|=\beta \qquad (5)$$

As mentioned above, at the correction points corresponding to the positions P1 and P3, by replacing the correction values which cause the corrected relative angles to match the ideal line with the correction values L α and Lβ, which are calculated in the above-mentioned way, the linearity error in the first peak and the linearity error in the third peak can be reduced as shown in FIG. 12.

Next, a correcting method using the correction values will be explained.

The correction values at the three or more correction points which are predetermined in the relative angle range are stored in the storage unit 202. Each correction point represents a relative angle which corresponds to an ideal stroke position of the shaft 2 and which includes a linearity error. The correction value at each correction point is the one for correcting the linearity error included in the relative angle calculated from the magnetic flux densities detected by the magnetic detecting unit 201, and the corrected relative angle has a value matching the ideal line. However, as mentioned above, the correction values at the correction points which are located outermost in the relative angle range are L α and Lβ each of which does not cause the corrected relative angle to match the ideal line. Further, the function to calculate an interpolated correction value between correction points by using correction values as parameters, and so on are stored as interpolation information in the storage unit 202.

The arithmetic operation unit 203 calculates the relative angle θ by using both the magnetic flux density in the direction of the Bx axis and the magnetic flux density in the direction of the Bz axis which are detected by the magnetic detecting unit 201, in accordance with the above equation (1).

When the calculated relative angle θ matches one of the three or more correction points stored in the storage unit 202, the arithmetic operation unit 203 then corrects the relative angle θ by using the correction value at the correction point matching the relative angle.

In contrast, when the calculated relative angle e differs from any of the three or more correction points stored in the storage unit 202, the arithmetic operation unit 203 uses, as parameters, the two correction values corresponding to the two adjacent correction points between which the relative angle θ is sandwiched, to carry out interpolation by using the function which is stored in the storage unit 202 and which is interpolation information, thereby calculating an interpolated correction value. The arithmetic operation unit 203 then corrects the relative angle θ by using the interpolated correction value.

As mentioned above, the interpolated correction value calculated by using the function can be a value which corresponds to, instead of the linearity error included in the relative angle θ, the relative angle in which the linearity error has been corrected.

Figure 13:
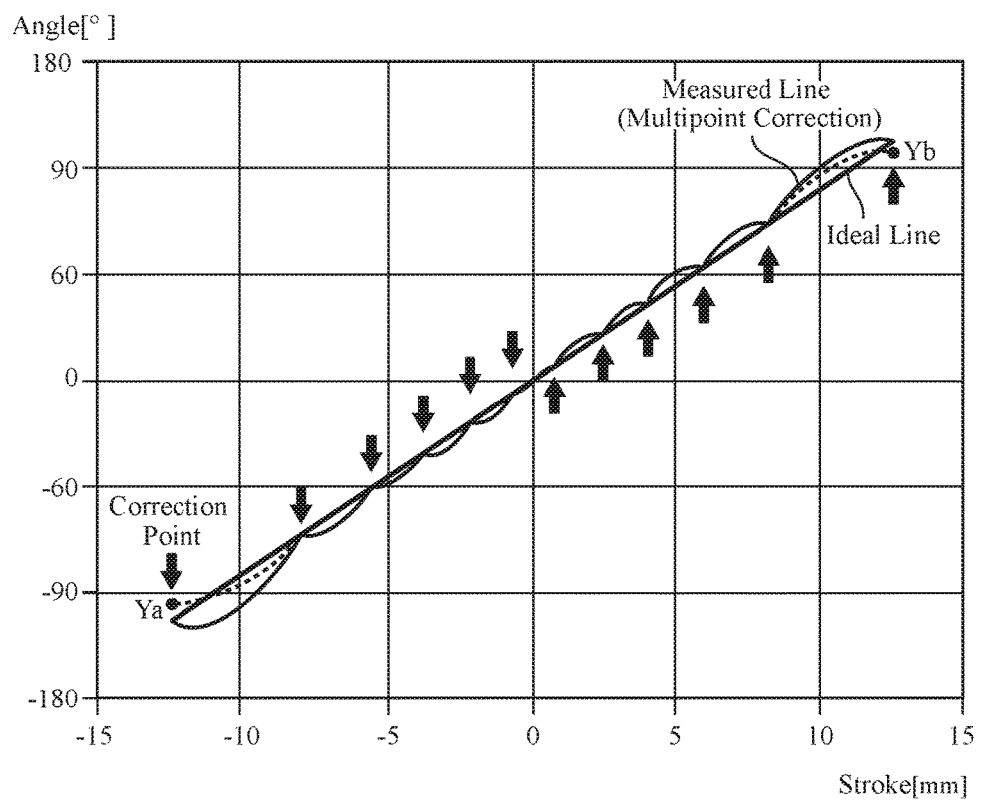
FIG. 13 is a graph showing an example of, in Embodiment 1, making a multipoint correction to the measured line shown in FIG. 8 by using the calculated correction values at the outermost correction points in the relative angle range.

FIG. 13 is a graph explaining the ideal line and the measured line each of which shows a correspondence between the relative angle θ calculated from the detected values of the magnetic flux densities in the two directions, and the stroke, the measured line being subjected to the multipoint correction. At the two correction points at both the ends of the relative angle range, in the case in which the relative angles are corrected by using the correction values Lα and Lβ, in such a way as to be equal to Ya and Yb which do not match the ideal line, the deviation between the ideal line and the measured line is small as a whole and the linearity is improved, as compared with the case in which the relative angles are corrected in such a way as to match the ideal line.

Next, the hardware structure of the Hall IC 20 will be explained.

Figure 14:
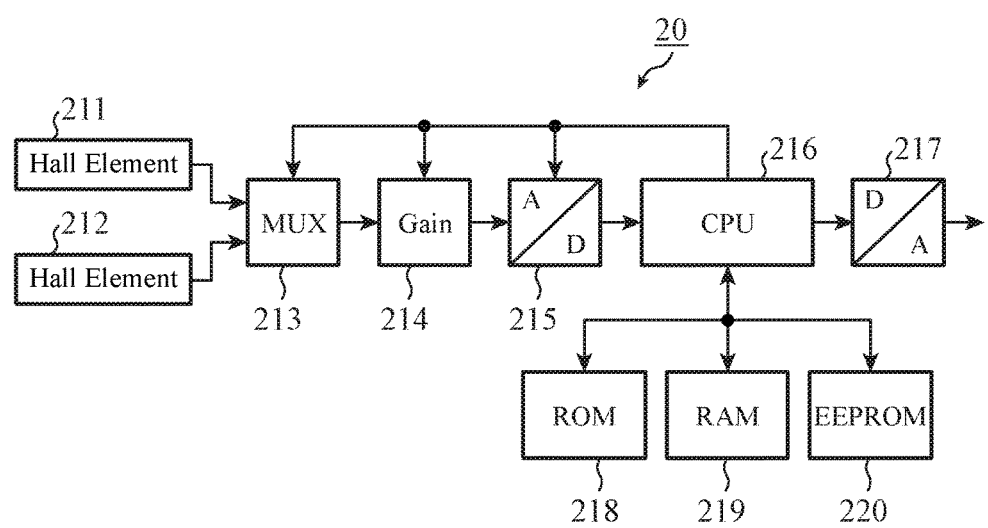
FIG. 14 is a diagram showing an example of the hardware structure of the Hall IC in Embodiment 1.

FIG. 14 is a diagram showing an example of the hardware structure of the Hall IC 20 in Embodiment 1.

A Hall element 211 detects the magnetic flux density in the direction of the Bx axis, and outputs the magnetic flux density to a multiplexer 213. A Hall element 212 detects the magnetic flux density in the direction of the Bz axis, and outputs the magnetic flux density to the multiplexer 213. These Hall elements 211 and 212 are the magnetic detecting unit 201.

Analog signals showing the detected values of the magnetic flux densities in the two directions, the analog signals being outputted from the Hall elements 211 and 212, are inputted to an amplifier 214 via the multiplexer 213. After the gains of the analog signals are changed by the amplifier 214, the analog signals are converted into digital signals by an AD (Analog-Digital) converter 215, and the digital signals are inputted to a CPU (Central Processing Unit) 216. After calculating the relative angle by using the magnetic flux densities in the two directions and correcting the linearity error in the relative angle, the CPU 216 outputs a digital signal showing the corrected relative angle. This digital signal is converted into an analog signal by a DA (Digital-Analog) converter 217, and the analog signal is outputted to outside the Hall IC 20. In a case of outputting the corrected relative angle to outside the Hall IC 20 in a state in which the corrected relative angle is maintained as a digital signal, the DA converter 217 is unnecessary.

The functions of the arithmetic operation unit 203 are implemented by software, firmware, or a combination of software and firmware. The software or the firmware is described as a program and the program is stored in a ROM (Read Only Memory) 218. The CPU 216 implements the functions of the arithmetic operation unit 203 by reading and executing the program stored in the ROM 218. More specifically, the Hall IC 20 includes a memory for storing a program in which, when the program is executed by the CPU 216, a step of calculating the relative angle by using the magnetic flux densities in the two directions, and correcting the linearity error in the relative angle is performed accordingly. Further, it can also be said that the program causes a computer to perform a procedure or a method which the arithmetic operation unit 203 uses. A RAM (Random Access Memory) 219 is a work area that temporarily stores either data inputted and outputted to and from the CPU 216 or the program read out from the ROM 218.

Further, an EEPROM (Electrically Erasable Programmable ROM) 220 is the storage unit 202 that stores the correction values at the three or more correction points which are predetermined in the relative angle range, and the function to calculate an interpolated correction value between correction points by using the correction values as parameters. Data stored in the EEPROM 220 can be rewritten by a writing tool or the like which will be mentioned below. The interpolation information, such as the function to calculate an interpolated correction value, can be stored in the EEPROM 220, or can be stored as a part of the above-mentioned program in the ROM 218.

The ROM 218, the RAM 219, and the EEPROM 220 are the storage unit 202.

Although in the example of FIG. 14 one IC chip having the functions of the magnetic detecting unit 201, the storage unit 202, and the arithmetic operation unit 203 is constructed, a part of the functions can be implemented as a circuit for exclusive use.

Next, a method of adjusting the actuator 1 will be explained. An adjustment to the actuator 1 is performed after the actuator 1 is assembled in a process of manufacturing the actuator 1.

Figure 15:
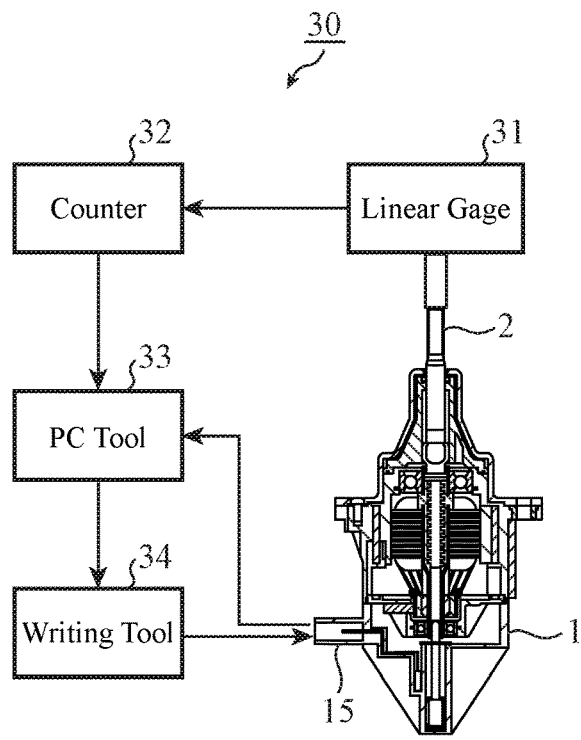
FIG. 15 is a diagram showing an example of the structure of a writing system according to Embodiment 1.

FIG. 15 is a diagram showing an example of the structure of a writing system 30 for writing the correction values in the EEPROM 220 of the Hall IC 20. The writing system 30 includes a linear gage 31, a counter 32, the PC tool 33, and a writing tool 34.

The linear gage 31 measures the position of an end of the shaft 2 of the actuator 1, and outputs a measurement signal to the counter 32. The counter 32 receives the measurement signal from the linear gage 31, converts the measurement signal into an electric signal which the PC tool 33 can receive, and outputs the electric signal to the PC tool 33.

These linear gage 31 and counter 32 are a measurement device that measures the stroke position of the shaft 2. The measurement device is not limited to the structure which is the combination of the linear gage 31 and the counter 32, and can be any type of device as long as the device can measure the stroke position of the shaft 2.

The PC tool 33 controls the current passing through the rotor coil 9 via the connector terminal 15 of the actuator 1, to sweep the shaft 2 of the actuator 1, i.e., move the shaft in one direction at a constant speed. During a time period during which the shaft 2 is swept, the PC tool 33 reads the relative angle which is outputted from the Hall IC 20 via the connector terminal 15, and also reads the stroke position of the shaft 2 outputted from the counter 32. The stroke position from the counter 32 has a value which can be converted into the relative angle of the magnet for sensor 22 with respect to the Hall IC 20. The correspondence between the relative angle after conversion and the stroke position is equivalent to the above-mentioned ideal line. The correspondence between the stroke position from the counter 32 and the relative angle from the Hall IC 20 is equivalent to the above-mentioned measured line.

Every time the stroke position from the counter 32 matches one of the three or more predetermined correction points, the PC tool 33 links the stroke position to the relative angle at that time from the Hall IC 20 and temporarily holds the stroke position and the relative angle.

Further, for one set of the stroke position and the relative angle from the Hall IC 20 which are linked to each other, the PC tool 33 converts the stroke position into a relative angle and defines this relative angle as an ideal value on the ideal line. The PC tool 33 then calculates the difference between the ideal value calculated and the relative angle from the Hall IC 20, and defines this difference as a correction value. It is assumed that information required for the conversion of the stroke position into a relative angle is provided for the PC tool 33 in advance. Further, the PC tool 33 defines the relative angle from the Hall IC 20 as a correction point which is used at a time of correction. More specifically, the PC tool 33 links the correction point which is the relative angle from the Hall IC 20 to the correction value which the PC tool has calculated by using the stroke position from the counter 32, to combine the correction point and the correction value into one set of data.

Further, for the two correction points at the positions P1 and P3 which are outermost in the relative angle range, the PC tool 33 calculates the above-mentioned correction values $L\alpha$ and $L\beta$.

The PC tool 33 then outputs data about all the three or more correction points, each data including one of the correction points and a correction value which are linked to each other, to the writing tool 34.

The PC tool 33 is a control device, such as a PC, a microcomputer, or a DSP (Digital Signal Processor).

The writing tool 34 receives the data from the PC tool 33, converts the data into an electric signal which the Hall IC 20 can receive, and writes the electric signal in the EEPROM 220 of the Hall IC 20 via the connector terminal 15 of the actuator 1.

The writing tool 34 is a writing device that writes data in the EEPROM 220 of the Hall IC 20, and is formed of a circuit for exclusive use or the like.

The interpolation information, such as the function to calculate an interpolated correction value, can be held by the Hall IC 20 in advance, or can be written, via the writing tool 34, in the Hall IC 20 by the PC tool 33.

Figure 16:
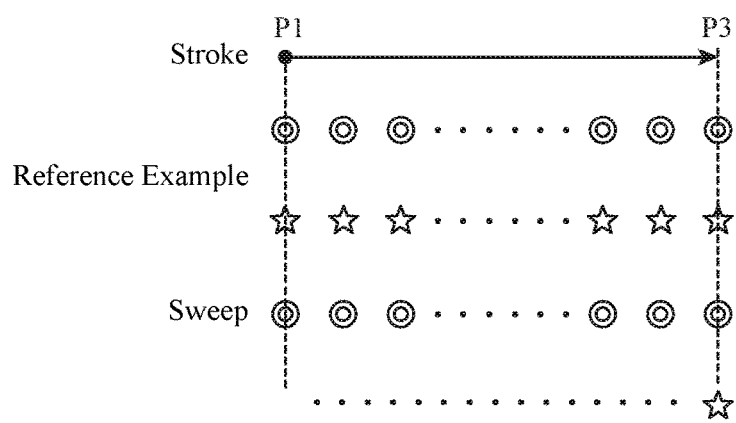
FIG. 16 is a figure explaining timing at which correction values are written by the writing system according to Embodiment 1.

FIG. 16 is a diagram explaining writing timing of the correction values. The horizontal axis shows the stroke of the shaft 2 from the position P1 to the position P3. Each double circle (◎) shows timing at which the PC tool 33 performs an operation of reading both the relative angle from the Hall IC 20 and the stroke position from the counter 32. Each star (☆) shows timing at which the PC tool 33 performs an operation of writing the correction point and the correction value in the Hall IC 20 via the writing tool 34.

In an example of operations shown as a reference example, the PC tool 33 moves the shaft 2 in such a way that the stroke position from the counter 32 matches the first correction point, reads the relative angle at that time from the Hall IC 20, calculates a correction value, and writes the correction point corresponding to the position P1 and the correction value in the Hall IC 20. The PC tool 33 then moves the shaft 2 to the next correction point, reads the relative angle at that time from the Hall IC 20, and writes the correction point and a correction value in the Hall IC 20. The PC tool 33 repeatedly performs the operation on each of other correction points until the PC tool moves the shaft to the position P3.

On the other hand, in an example of the operations according to Embodiment 1, the PC tool 33 sweeps the shaft 2 from the position P1 to the position P3 without stopping the shaft 2, and reads the relative angle from the Hall IC 20 and the stroke position from the counter 32 at each correction point during the sweeping operation. The PC tool 33 calculates a correction value at each correction point after the sweep, and writes the correction values at the correction points in the Hall IC 20 at a time. As a result, the writing time can be shortened because of an elimination of the communicating process, the process capability can be improved, and the tact time can be reduced in the production line, as compared with the reference example.

Figure 17:
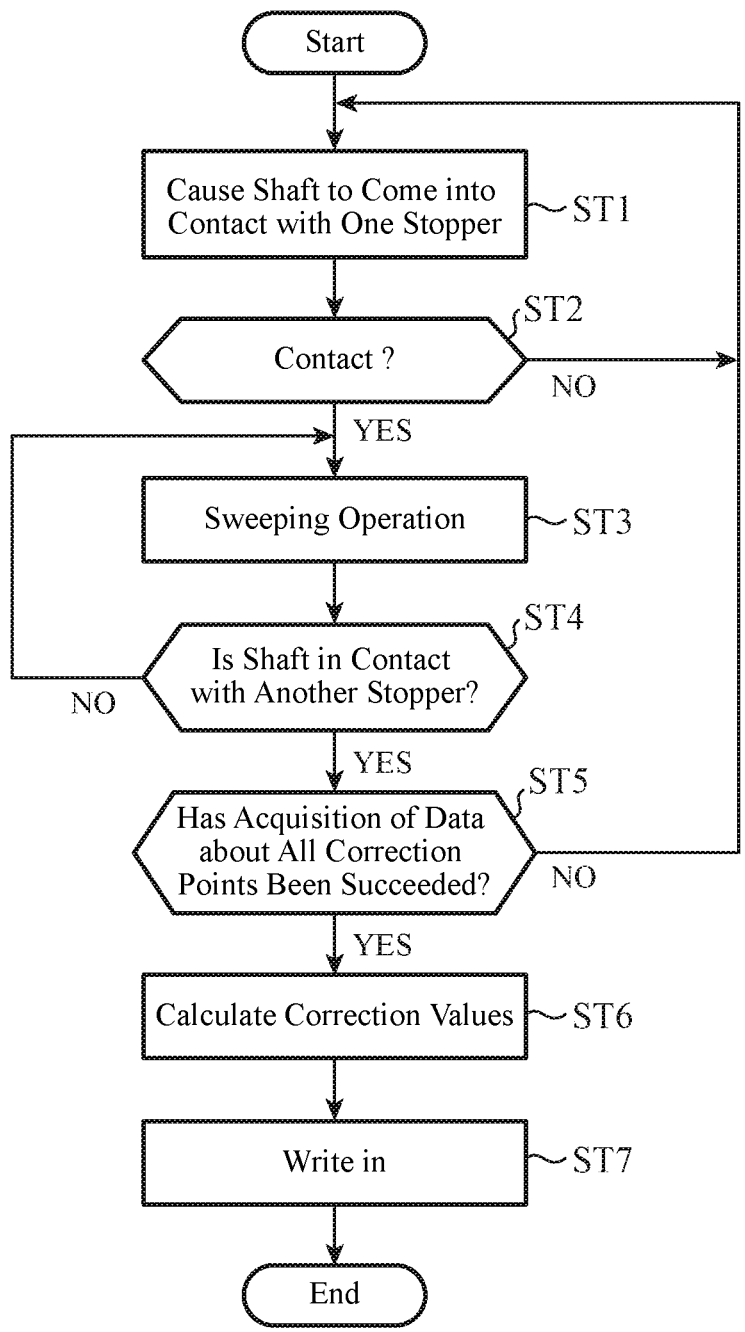
FIG. 17 is a flow chart showing an example of a method of adjusting the actuator which is executed by the writing system according to Embodiment 1.

FIG. 17 is a flow chart showing the method of adjusting the actuator 1.

In step ST1, the PC tool 33 controls the movement of the shaft 2 to cause the contact portion 19b to come into contact with the stopper 19a. The position where the stopper 19a is in contact with the contact portion 19b corresponds to the position P1.

In step 2, when the stroke position from the counter 32 or the relative angle from the Hall IC 20 does not change during a predetermined time period, the PC tool 33 determines that the stopper 19a is in contact with the contact portion 19b (when "YES" in step ST2), and advances to step ST3. In contrast, when the stroke position from the counter 32 or the relative angle from the Hall IC 20 changes during the predetermined time period, the PC tool 33 determines that the stopper 19a is not in contact with the contact portion 19b (when "NO" in step ST2), and returns to step ST1.

In step ST3, the PC tool 33 sweeps the shaft 2 from the position P1 to the position P3. Further, during the sweeping operation, the PC tool 33 reads both the relative angle from the Hall IC 20 and the stroke position from the counter 32, links the stroke position to the relative angle for each correction point, and temporarily holds the stroke position and the relative angle.

In step ST4, the PC tool 33 determines whether the shaft 2 has moved to the position P3. Concretely, when the stroke position from the counter 32 or the relative angle from the Hall IC 20 does not change during a predetermined time period, the PC tool 33 determines that the stopper 18a is in contact with the contact portion 18b (when "YES" in step ST4), and advances to step ST5. In contrast, when the stroke position from the counter 32 or the relative angle from the Hall IC 20 changes during the predetermined time period, the PC tool 33 determines that the stopper 18a is not in contact with the contact portion 18b (when "NO" in step ST4), and returns to step ST3.

When, in step ST5, having succeeded in acquiring both the stroke position and the relative angle at every of the three or more predetermined correction points (when "YES" in step ST5), the PC tool 33 advances to step ST6. In contrast, when there is a correction point at which the PC tool 33 has failed to acquire both the stroke position and the relative angle (when "NO" in step ST5), the PC tool 33 returns to step ST1 and redoes the processes of step ST1 to ST5.

In step ST6, the PC tool 33 calculates the correction values Lα and Lβ at the correction points corresponding to the positions P1 and P3, and calculates, as a correction value at any other correction point, a correction value based on the relative angle converted from the stroke position acquired in step ST3.

In step ST7, the PC tool 33 writes all the correction points and all the correction values in the Hall IC 20 via the writing tool 34.

Although in the above-mentioned explanation the example of sweeping the shaft 2 from the position P1 to the position P3 is shown, the shaft 2 can be swept in the opposite direction from the position P3 to the position P1.

Because the positions P1 and P3 corresponding to both ends of the relative angle range are determined by the contact between the metallic stopper 18a and the contact portion 18b and the contact between the metallic stopper 19a and the contact portion 19b, it is difficult for each of the stoppers and the corresponding contact portion to become deformed even if a planar pressure is applied to their contact portions, and therefore the accuracy of the positions is high. Thus, it is not necessary to adjust the relative angle range of the Hall IC 20 and the stroke range of the shaft 2 for each of products embodying the actuator 1. Further, plastic deformations occurring at times when the stoppers 18a and 19a come into contact with the contact portions 18b and 19b can be reduced to a minimum, and the accuracy of the linearity at a time when the arithmetic operation unit 203 makes a correction can be improved.

In addition, by repeatedly performing the reading operation in the above-mentioned sweeping operation multiple times and calculating plural sets of correction values L α and Lβ, variations in the measurements performed by the Hall IC 20 can be suppressed. This example will be explained using a flow chart of FIG. 18.

Figure 18:
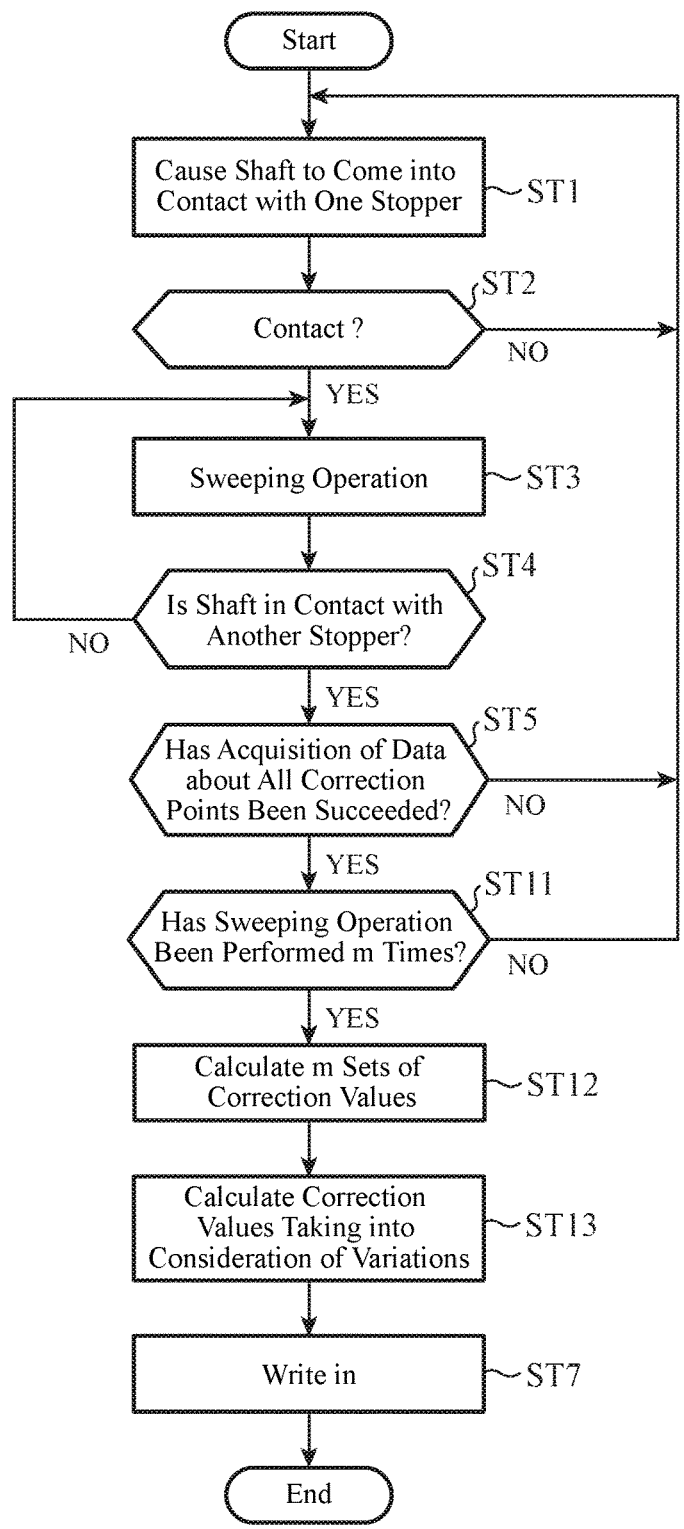
FIG. 18 is a flow chart showing another example of the method of adjusting the actuator which is executed by the writing system according to Embodiment 1.

In the flow chart of FIG. 18, the PC tool 33 performs processes of steps ST1 to ST5, like in the case of the flowchart of FIG. 17.

In step ST11, the PC tool 33 determines whether the PC tool has performed a sweeping operation of steps ST1 to ST5 m times. m is a predetermined value. For example, m is set to m=3 to 5. When determining that the sweeping operation has been performed m times (when "YES" in step ST11), the PC tool 33 advances to step ST12, whereas when the number of times that the sweeping operation has been performed is less than m (when "NO" in step ST11), the PC tool returns to step ST1 and performs the sweeping operation.

In step ST12, the PC tool 33 calculates m correction values Lα and m correction values Lβ by using m sets each having a stroke position and a relative angle which have been acquired at the correction points corresponding to the positions P1 and P3.

In step ST13, the PC tool 33 calculates one final correction value Lα in which variations in the m correction values Lα are taken into consideration, and also calculates one final correction value Lβ in which variations in the m correction values Lβ are taken into consideration. For example, the PC tool 33 calculates the median value of the m correction values Lα as the final correction value Lα. Also, for example, the PC tool 33 calculates the average of the m correction values La and defines this average as the final correction value Lα. The PC tool 33 also calculates the correction value Lβ by using the same method.

A correction value at any correction point other than the positions P1 and P3 can be calculated by using a stroke position acquired through one of the m sweeping operations. As an alternative, as the correction value, a value in which variations in m calculated values are taken into consideration can be calculated and used, like in the case of calculating the correction values Lα and Lβ.

In step ST7, the PC tool 33 writes all the correction points and all the correction values in the Hall IC 20 via the writing tool 34.

Although in the above-mentioned explanation the example of sweeping the shaft 2 from the position P1 to the position P3 is shown, the shaft 2 can be swept in the opposite direction from the position P3 to the position P1. Further, every time the sweeping operation has been completed once, the direction in which the shaft 2 is moved can be reversed.

As mentioned above, according to Embodiment 1, the actuator 1 is constructed so as to include: the shaft 2 that can reciprocate in the axis direction; the motor unit 3 that causes the shaft 2 to reciprocate; the magnet for sensor 22 that reciprocates in synchronization with a reciprocating motion of the shaft 2; the magnetic detecting unit 201 that detects magnetic flux densities in two directions of a magnetic field which vary with a reciprocating motion of the magnet for sensor 22; the storage unit 202 that stores both correction values at three or more correction points which are predetermined in a relative angle range within which the magnet for sensor 22 can reciprocate with respect to the magnetic detecting unit 201, and a function to calculate an interpolated correction value between correction points by using the correction values as parameters; and the arithmetic operation unit 203 that calculates a relative angle of the magnet for sensor 22 with respect to the magnetic detecting unit 201 by using the magnetic flux densities in the two directions which are detected by the magnetic detecting unit 201, and that corrects a linearity error in the relative angle by using an interpolated correction value calculatedfrom either the correction values or the function which are stored in the storage unit 202. Further, the storage unit 202 is constructed so as to store, as a correction value at an outermost correction point in the relative angle range, a correction value causing an absolute value of an outermost extremum out of plural extremums in the relative angle range to be equal to or less than an absolute value of another extremum out of the plural extremums which is located inwardly next to the outermost extremum, the plural extremums being exhibited by the linearity error in the relative angle which is corrected by using an interpolated correction value calculated from the function which uses the correction values as parameters. Therefore, by using the correction value and an interpolated correction value calculated from the function which uses the correction value as a parameter to correct the relative angle on an outer end, where linearity error is substantial, in the relative angle range, an actuator 1 having a small linearity error can be provided.

Further, according to Embodiment 1, the storage unit 202 is constructed so as to store, as a correction value at an outermost correction point on one end of the relative angle range, a first correction value causing an absolute value of an outermost extremum out of the plural extremums on the one end of the relative angle range to be equal to or less than an absolute value of another extremum out of the plural extremums which is located inwardly next to the outermost extremum, and also store, as a correction value at an outermost correction point on another end of the relative angle range, a second correction value causing an absolute value of an outermost extremum out of the plural extremums in on another end of the relative angle range to be equal to or less than an absolute value of another extremum out of the plural extremums which is located one extremum inwardly next to the outermost extremum. Thus, in each of both sides of the relative angle range, the tolerances on the components of the actuator 1, and so on can be accommodated. Therefore, even in a case in which there are variations in products embodying the actuator 1, the same linearity can be provided.

Further, according to Embodiment 1, the actuator 1 is constructed so as to include the metallic stoppers 18a and 19a and the contact portions 18b and 19b as stoppers for restricting the range within which the shaft 2 reciprocates. Thus, plastic deformations occurring at times when the stoppers come into contact with the contact portions can be reduced to a minimum, and the accuracy of the linearity at a time when a correction is made can be improved.

Further, according to Embodiment 1, in the method of adjusting the actuator 1, the linear gage 31 and the counter 32 measure the position of the shaft 2, the PC tool 33 causes the actuator 1 to operate, thereby moving the shaft 2 in one direction, and uses both the position of the shaft 2 measured by the linear gage 31 and the counter 32 and the relative angle calculated by the arithmetic operation unit 203 while the shaft is being moved, to calculate correction values at three or more correction points which are predetermined in the relative angle range, and, after the movement of the shaft 2 is completed, the writing tool 34 writes the correction values at the correction points which are calculated by the PC tool 33 in the storage unit 202 at one time. Thus, the writing time can be shortened.

Further, according to Embodiment 1, in the method of adjusting the actuator 1, the PC tool 33 moves the shaft 2 multiple times, and calculates a correction value at an outermost correction point in the relative angle range by using the positions of the shaft 2 and the relative angles which have been determined multiple times. Thus, variations in the measurements performed by the Hall IC 20 can be prevented, and the accuracy of the linearity at a time when a correction is made can be improved.

Further, although in Embodiment 1 the example of the structure in which the Hall IC 20 outputs the relative angle is explained, there can be provided a structure of converting this relative angle into the stroke position of the shaft 2 and outputting the stroke position. In this structure, for example, the storage unit 202 stores information including a function required to convert the relative angle into the stroke position, and so on, and the arithmetic operation unit 203 converts the relative angle into the stroke position by using the information stored in the storage unit 202 and outputs the stroke position.

Various changes can be made in any component according to an embodiment, or any component according to an embodiment can be omitted within the scope of the invention.

INDUSTRIAL APPLICABILITY

Because the actuator according to the present invention improves the linearity in an outer region of the relative angle range in which the linearity becomes worst, when using an Hall IC that can make a multipoint correction at equiangular intervals, the actuator is suitable for use as an actuator that is required to perform a high-accuracy operation, such as an actuator that performs opening and closing control on a waste gate valve of a turbocharger.

REFERENCE SIGNS LIST 1 actuator, 2 shaft, 3 motor unit, 4 motor housing, 5 and 6 bearing, 7 pipe, 8 rotor core, 9 rotor coil, 10 commutator, 11 magnet, 12 back yoke, 13 female screw portion, 14 male screw portion, 15 connector terminal, 16 brush, 17 sensor housing, 18a and 19a stopper, 18b and 19b contact portion, 20 Hall IC, 21 shaft for sensor, 22 magnet for sensor, 30 writing system, 31 linear gage (measurement device), 32 counter (measurement device), 33 PC tool (control device), 34 writing tool (writing device), 201 magnetic detecting unit, 202 storage unit, 203 arithmetic operation unit, 211 and 212 Hall element, 213 multiplexer, 214 amplifier, 215 AD converter, 216 CPU, 217 DA converter, 218 ROM, 219 RAM, and 220 EEPROM.

The invention claimed is:

1. An actuator comprising:

a shaft capable of reciprocating in an axis direction;

a driver to drive the shaft to reciprocate;

a magnet that reciprocates in synchronization with a reciprocating motion of the shaft;

a magnetic detector to detect magnetic flux densities in two directions of a magnetic field which vary with a reciprocating motion of the magnet;

a storage to store both correction values at three or more correction points which are predetermined in a relative angle range within which the magnet can reciprocate with respect to the magnetic detector, and a function to calculate an interpolated correction value between correction points by using the correction values as parameters; and an arithmetic operator to calculate a relative angle of the magnet with respect to the magnetic detector by using the magnetic flux densities in the two directions which are detected by the magnetic detector, and to correct a linearity error in the relative angle by using the interpolated correction value calculated from either the correction values or the function which is stored in the storage, wherein the storage stores, as a correction value at an outermost correction point in the relative angle range, a correction value causing an absolute value of an outermost extremum out of plural extremums in the relative angle range to be equal to or less than an absolute value of another extremum out of the plural extremums which is located inwardly next to the outermost extremum, the plural extremums being exhibited by a linearity error in a relative angle which is corrected by using an interpolated correction value calculated from the function which uses the correction values as parameters.

2. The actuator according to claim 1, wherein the storage stores, as a correction value at an outermost correction point at one end of the relative angle range, a first correction value causing an absolute value of an outermost extremum out of the plural extremums at the one end of the relative angle range to be equal to or less than an absolute value of another extremum out of the plural extremums which is located inwardly next to the outermost extremum, and also stores, as a correction value at an outermost correction point at another end of the relative angle range, a second correction value causing an absolute value of an outermost extremum out of the plural extremums at said another end of the relative angle range to be equal to or less than an absolute value of another extremum out of the plural extremums which is located inwardly next to the outermost extremum.

3. The actuator according to claim 2, wherein the first correction value and the second correction value are different from each other.

4. The actuator according to claim 1, wherein the actuator includes metallic stoppers to restrict a range within which the shaft reciprocates.

5. An actuator adjusting method of writing correction values in the storage which the actuator according to claim 1 includes, the actuator adjusting method comprising:
   in a measurement device, measuring a position of the shaft;
   in a control device, operating the actuator to move the shaft in one direction, and using both the position of the shaft measured by the measurement device and the relative angle calculated by the arithmetic operation unit while the shaft is being moved, to calculate correction values at three or more correction points which are predetermined in the relative angle range; and
   in a writing device, after the movement of the shaft is completed, writing the correction values at the correction points which are calculated by the control device in the storage at one time.

6. The actuator adjusting method according to claim 5, wherein, by the control device, moving the shaft multiple times, and calculating a correction value at an outermost correction point in the relative angle range by using positions of the shaft and relative angles which have been determined multiple times.

* * * * *